United States Patent
Jang et al.

(10) Patent No.: US 8,605,042 B2
(45) Date of Patent: Dec. 10, 2013

(54) SENSING DEVICE AND METHOD FOR AMPLIFYING OUTPUT THEREOF

(75) Inventors: Suhyuk Jang, Daegu (KR); Hwanjoo Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1163 days.

(21) Appl. No.: 12/461,201

(22) Filed: Aug. 4, 2009

(65) Prior Publication Data

US 2010/0097345 A1 Apr. 22, 2010

(30) Foreign Application Priority Data

Oct. 21, 2008 (KR) ........................ 10-2008-0102986

(51) Int. Cl.
*G06F 3/041* (2006.01)
*G06F 3/038* (2013.01)
*G09G 5/00* (2006.01)

(52) U.S. Cl.
USPC .......................................... 345/173; 345/207

(58) Field of Classification Search
USPC ........................................................... 345/173
See application file for complete search history.

(56) References Cited

U.S. PATENT DOCUMENTS

| 2001/0015725 A1* | 8/2001 | Nakanishi et al. ............ 345/207 |
| 2006/0097991 A1* | 5/2006 | Hotelling et al. ............. 345/173 |
| 2006/0284856 A1* | 12/2006 | Soss .............................. 345/173 |

FOREIGN PATENT DOCUMENTS

| CN | 87100460 | 10/1987 |
| CN | 1707568 | 12/2005 |
| CN | 101165644 | 4/2008 |
| JP | 2007-11152 A | 1/2007 |
| KR | 20080085164 A | 9/2008 |

* cited by examiner

*Primary Examiner* — Charles V Hicks
(74) *Attorney, Agent, or Firm* — McKenna, Long & Aldridge, LLP.

(57) ABSTRACT

A sensing device and a method for amplifying an output of the sensing device are disclosed. The sensing device includes a sensor array including a plurality of sensors and an amplifier circuit that gives different weighted values to at least some of sensor outputs obtained from the sensor array and amplifies each of the at least some sensor outputs.

16 Claims, 22 Drawing Sheets

SENSING DEVICE AND METHOD FOR AMPLIFYING OUTPUT THEREOF

This application claims the benefit of Korea Patent Application No. 10-2008-0102986 filed on Oct. 21, 2008, which is incorporated herein by reference for all purposes as if fully set forth herein.

BACKGROUND OF THE INVENTION

1. Field of the Invention

Embodiments of the invention relate to a sensing device and a method for amplifying an output of the sensing device for increasing sensibility and accuracy of sensors.

2. Discussion of the Related Art

With a recent trend toward thin profile and lightness in weight of electric home appliances or personal digital appliances, a button switch as user's input means has been substituted for a touch sensor.

A capacitance type touch sensor, a resistance type touch sensor, a pressure type touch sensor, an optical type touch sensor, an ultrasonic type touch sensor, and the like, are known as the touch sensor. A touch screen is composed of a plurality of touch sensors formed on a display device. Even if a user touches the touch screen with his or her finger or a pen, it is difficult to determine whether or not the touch screen is touched through only a comparison of a threshold value. Thus, it may be recognized that the touch screen is not touched.

SUMMARY OF THE INVENTION

Embodiments of the invention provide a sensing device and a method for amplifying an output of the sensing device capable of increasing sensibility and accuracy of sensors.

In one aspect, there is a sensing device comprising a sensor array including a plurality of sensors and an amplifier circuit that gives different weighted values to at least some of sensor outputs obtained from the sensor array and amplifies each of the at least some sensor outputs.

The amplifier circuit gives a maximum weighted value to a sensor output to be amplified and gives a weighted value less than the maximum weighted value to a sensor output adjacent to the sensor output to be amplified.

The amplifier circuit sets a mask that gives the different weighted values to sensor outputs obtained from the sensors, whose a total number is an odd number, positioned on the same line. When the amplifier circuit shifts the mask, the amplifier circuit amplifies each of the sensor outputs.

The amplifier circuit gives a maximum weighted value to the sensor output positioned in the middle of the mask and gives a minimum weighted value to the sensor outputs positioned at both edges of the mask.

The amplifier circuit gives the decreasing weighed values to the sensor outputs as the sensor outputs go from the middle to both edges of the mask.

In another aspect, there is a method for amplifying an output of a sensing device comprising obtaining sensor outputs from a sensor array including a plurality of sensors and giving different weighted values to at least some of the sensor outputs to amplify each of the at least some sensor outputs.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 6:
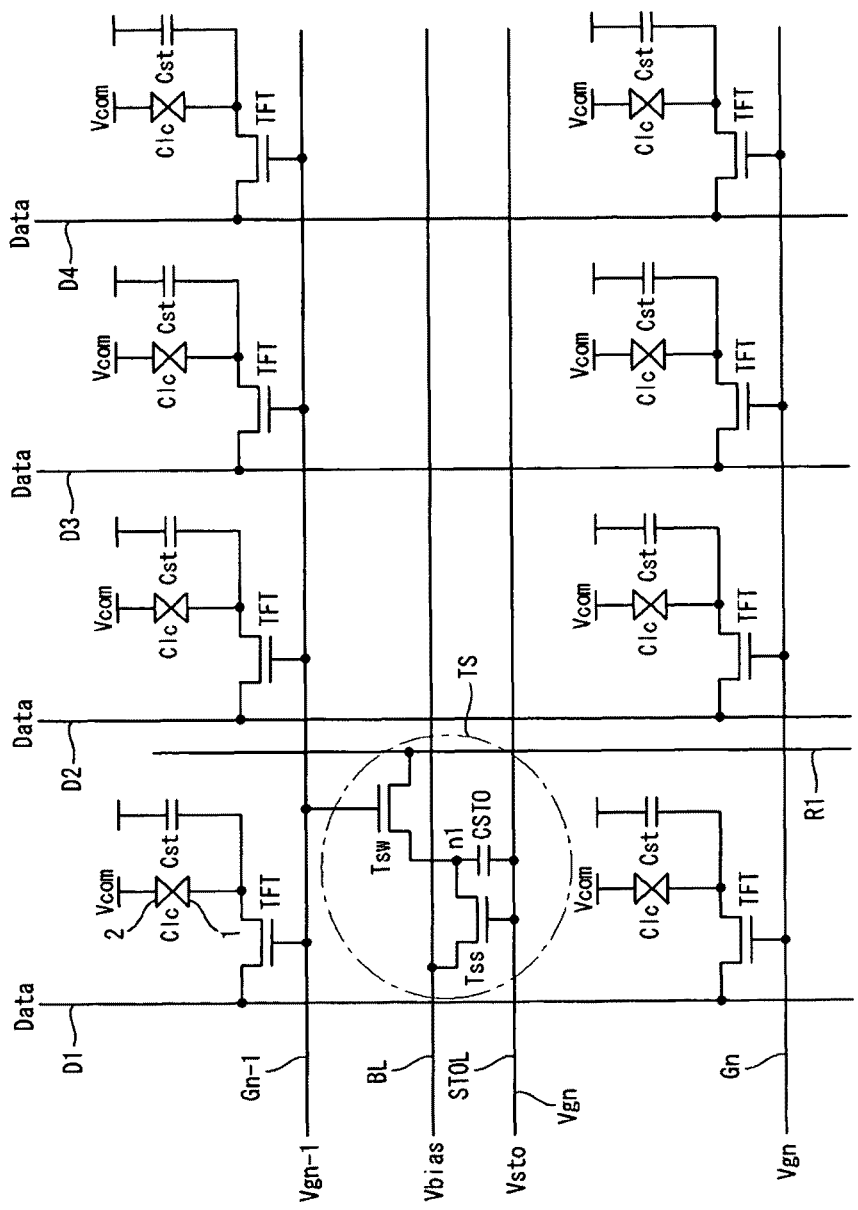
FIG. 6 is an equivalent circuit diagram illustrating an exemplary structure of touch sensors mounted inside a pixel array of a display panel.
Figure 7:
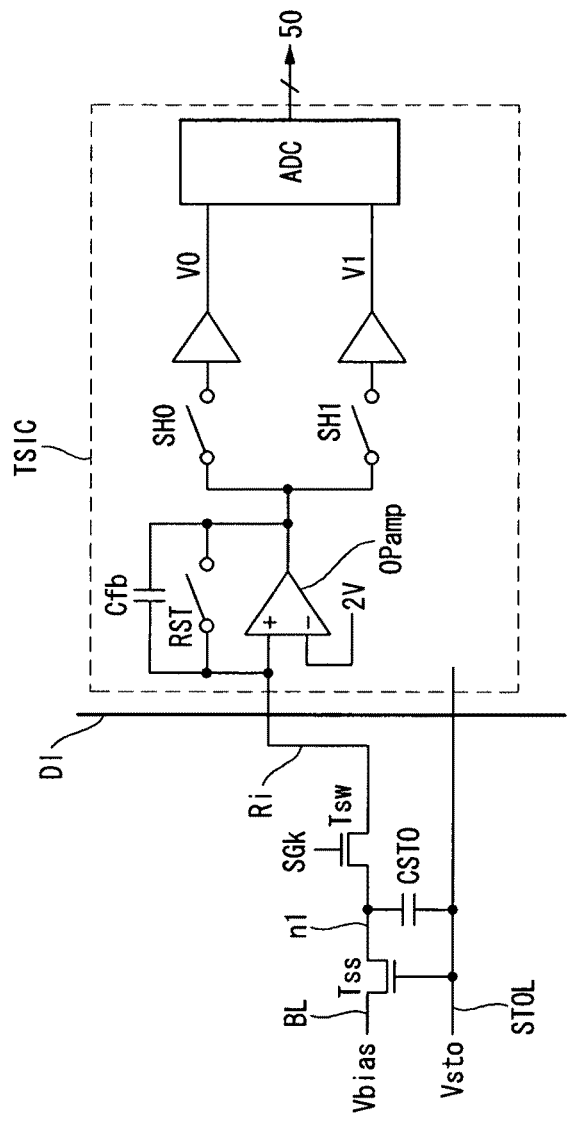
FIG. 7 is an equivalent circuit diagram illustrating touch sensors mounted inside a pixel array of a display panel and a touch sensor integrated circuit (TSIC)
Figure 8:
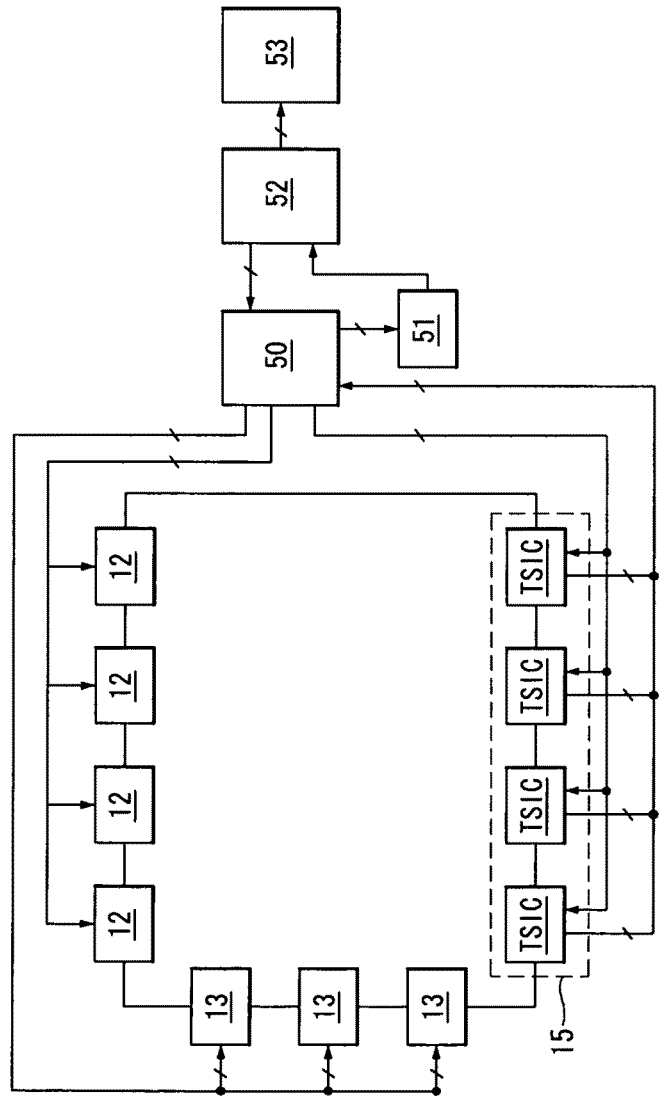
FIG. 8 illustrates an experimental device of touch data.

As shown in FIGS. 1 to 7, a sensing device according to an embodiment of the invention includes a touch sensor array 14 and a touch signal processing circuit 15 for processing output signals of the touch sensor array 14. The touch sensor array 14 includes a plurality of touch sensors connected to readout lines R1 to Ri. As shown in FIGS. 1 to 4, the touch sensor array 14 may be stacked on a display panel 10 of the display device, may be inserted in the display panel 10, or may be formed inside a pixel array of the display panel 10 so that the touch sensor array 14 and the display panel 10 form an integral body. The touch signal processing circuit 15, as shown in FIG. 8, includes a plurality of touch sensor integrated circuits (TSICs). The touch signal processing circuit 15 supplies a driving voltage to the touch sensors of the touch sensor array 14 and converts differential voltages between touch data voltages output from the touch sensors through the readout lines R1 to Ri and a reference voltage into digital data.

The sensing device according to the embodiment of the invention includes a touch data amplifier circuit and a touch recognition circuit. The touch data amplifying circuit gives a weighted value to the digital data output from the touch signal processing circuit 15, gives a relatively small weighted value to adjacent digital data, and amplifies the digital data output from the touch signal processing circuit 15. The touch recognition circuit compares touch data amplified by the touch data amplifier circuit with a predetermined threshold value to determine whether or not the touch sensor array 14 is touched.

The display device includes the display panel 10, a timing controller 11, a data drive circuit 12, and a scan drive circuit 13. The display device may be implemented as a flat panel display such as a liquid crystal display (LCD), a field emission display (FED), a plasma display panel (PDP), and an electroluminescence device (EL) such as an organic light emitting diode (OLED) display. In the embodiment, the liquid crystal display will be described as the display device.

Figure 5:
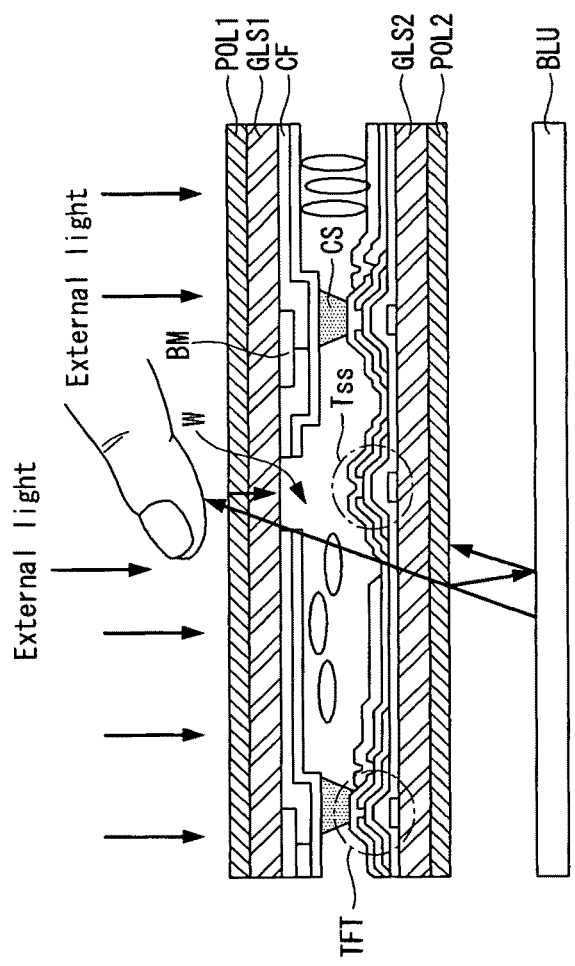
FIG. 5 is a cross-sectional view illustrating an exemplary structure of touch sensors mounted inside a pixel array of a display panel.

As shown in FIG. 5, a liquid crystal display may further include a backlight unit BLU providing light to the display panel 10. The backlight unit BLU may be implemented as an edge type backlight unit, in which light sources are positioned opposite the side of a light guide plate, or a direct type backlight unit, in which light sources are positioned under a diffusion plate.

The display panel 10 includes an upper glass substrate GLS1, a lower glass substrate GLS2, and a liquid crystal layer between the upper and lower glass substrates GLS1 and GLS2. The lower glass substrate GLS2 of the display panel 10, as shown in FIGS. 1 to 6, includes a plurality of data lines D1 to Dm, a plurality of gate lines G1 to Gn crossing the data lines D1 to Dm, a plurality of thin film transistors (TFTs), each of which is formed at each of crossings of the data lines D1 to Dm and the gate lines G1 to Gn, a plurality of pixel electrodes 1 for charging liquid crystal cells Clc to a data voltage, a storage capacitor Cst that is connected to the pixel electrodes 1 and keeps a voltage of the liquid crystal cells Clc constant, and the like. The liquid crystal cells Clc are arranged in a matrix format through a crossing structure of the data lines D1 to Dm and the gate lines G1 to Gn. The upper glass substrate GLS1 of the display panel 10 includes a black matrix BM, a color filter CF, a common electrode 2, and the like. The common electrode 2 is formed on the upper glass substrate GLS1 in a vertical electric drive manner, such as a twisted nematic (TN) mode and a vertical alignment (VA) mode. The common electrode 2 and the pixel electrode 1 are formed on the lower glass substrate GLS2 in a horizontal electric drive manner, such as an in-plane switching (IPS) mode and a fringe field switching (FFS) mode. Polarizing plates POL1 and POL2 are respectively attached to the upper and lower glass substrates GLS1 and GLS2. Alignment layers for setting a pre-tilt angle of liquid crystals in an interface contacting the liquid crystals are respectively formed on the upper and lower glass substrates GLS1 and GLS2. A column spacer CS may be formed between the upper and lower glass substrates GLS1 and GLS2 to keep cell gaps of the liquid crystal cells Clc constant.

The timing controller 11 receives timing signals, such as a data enable signal DE and a dot clock CLK from the outside to generate control signals for controlling operation timing of each of the data drive circuit 12 and the scan drive circuit 13. A control signal for controlling operation timing of the scan drive circuit 13 includes a gate start pulse GSP, a gate shift clock GSC, a gate output enable signal GOE, a shift direction control signal DIR, and the like. A control signal for controlling operation timing of the data drive circuit 12 includes a source sampling clock SSC, a source output enable signal SOE, a polarity control signal POL, and the like. The timing controller 11 controls the data drive circuit 12 and the scan drive circuit 13 and also may generate a control signal for controlling input/output operation timing of the touch signal processing circuit 15 to control the touch signal processing circuit 15. For example, the timing controller 11, as shown in FIG. 7, may generate a reset signal RST, a reference voltage sampling signal SH0, a touch voltage sampling signal SH1, etc. for controlling operation timing of the TSICs.

The data drive circuit 12 includes a plurality of source drive integrated circuits (ICs). The data drive circuit 12 latches digital video data RGB under the control of the timing controller 11 and converts the digital video data RGB into analog positive/negative gamma compensation voltage to generate the analog positive/negative gamma compensation voltage. The data drive circuit 12 supplies the analog positive/negative gamma compensation voltage to the data lines D1 to Dm.

The scan drive circuit 13 includes one or more scan drive ICs. The scan drive circuit 13 sequentially supplies scan pulses (or gate pulses) to the gate lines G1 to Gn.

Figure 1:
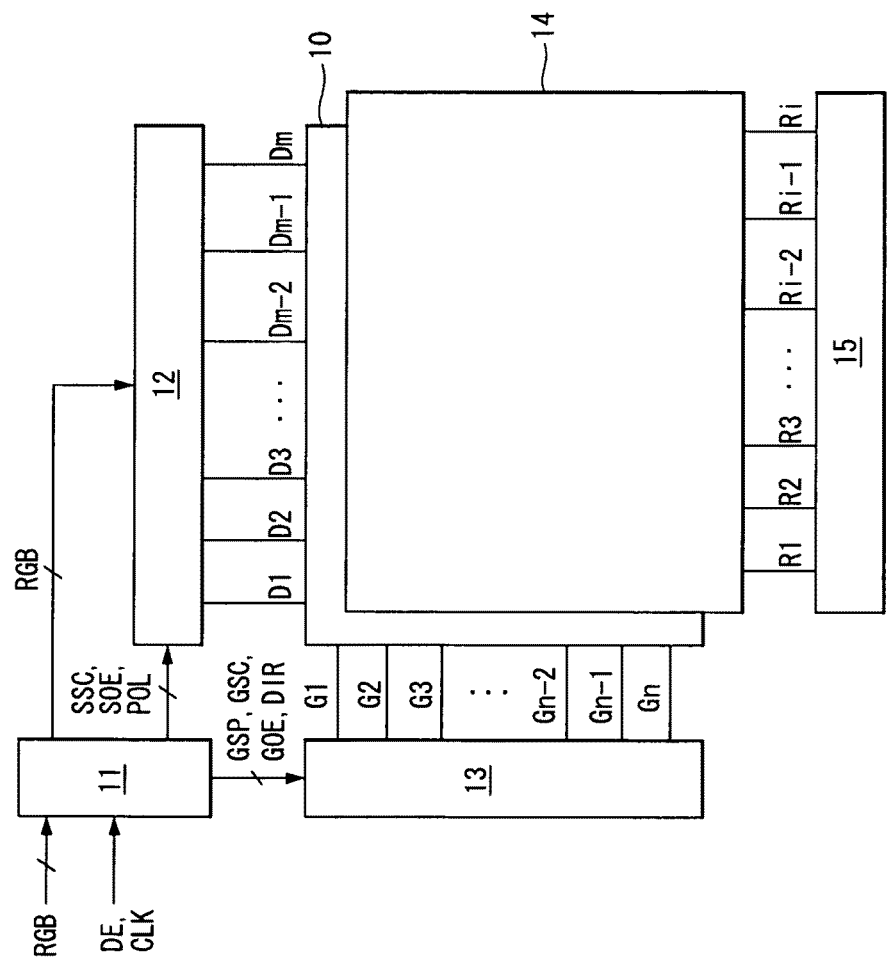
FIG. 1 is a block diagram illustrating a sensing device and a display device according to an embodiment of the invention.
Figure 2:
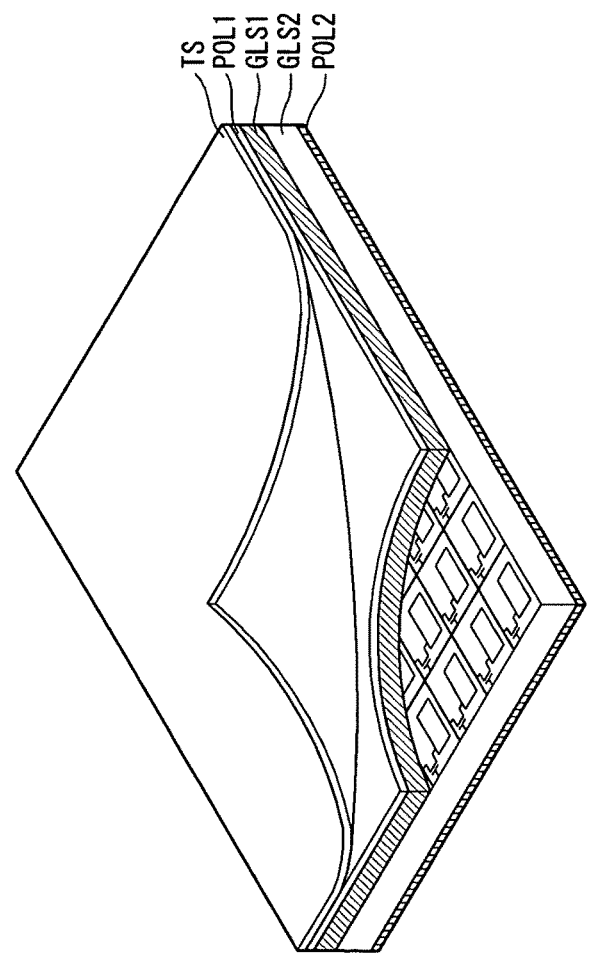
FIGS. 2 to 4 illustrate various exemplary configurations between touch sensors and a display panel.
Figure 3:
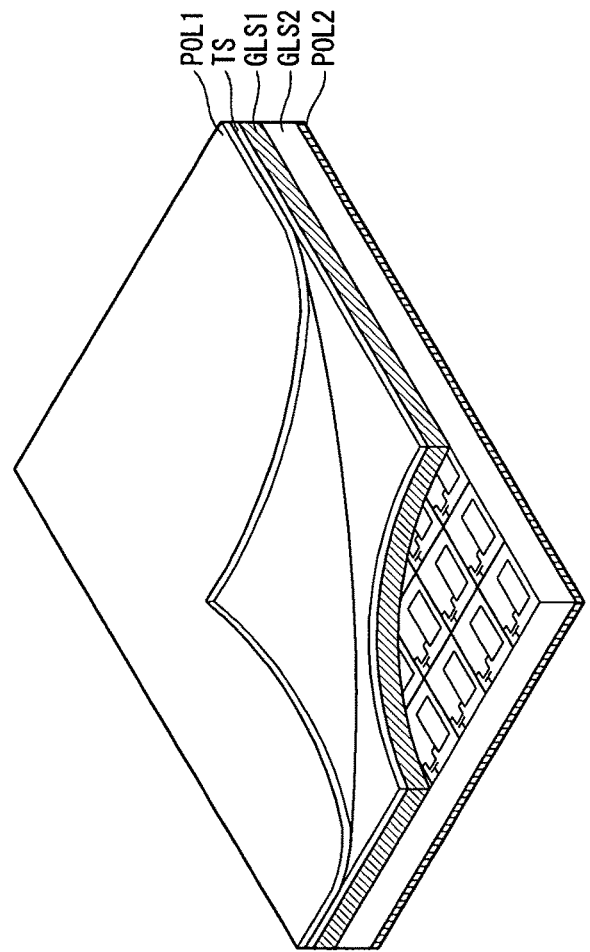
Figure 4:
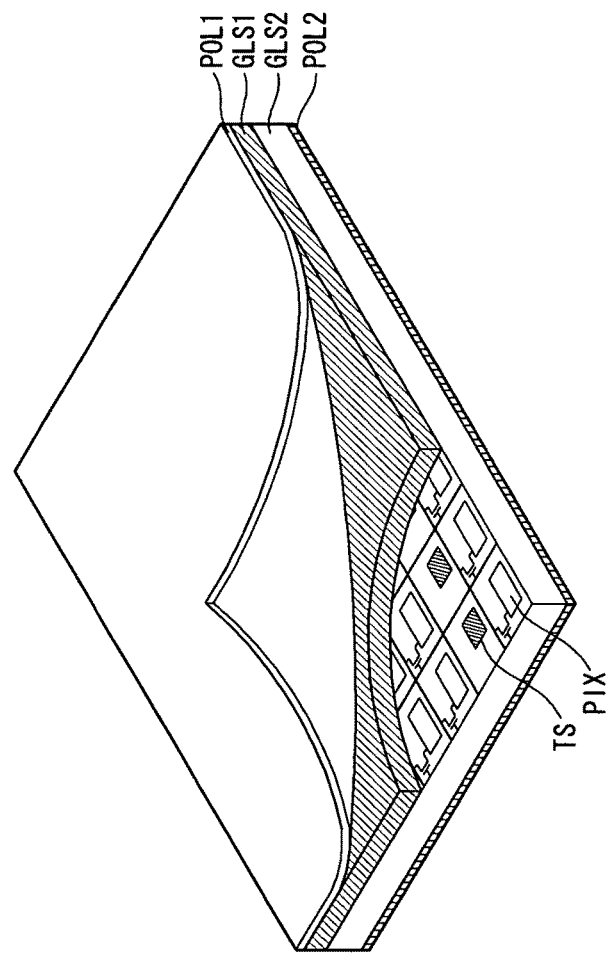

FIGS. 2 to 4 illustrate various exemplary configurations between the touch sensors and the display panel 10.

As shown in FIG. 2, the touch sensor array 14 may include a touch sensor TS stacked on the upper polarizing plate POL1 of the display panel 10. As shown in FIG. 3, the touch sensor array 14 may be mounted inside the display panel 10 and may include a touch sensor TS interposed between the upper polarizing plate POL1 and the upper glass substrate GLS1. The touch sensor array 14 shown in FIGS. 2 and 3 may be implemented as a resistance layer type touch sensor, a capacitance type touch sensor, a surface acoustic wave (SAW) type touch sensor, or an infrared type touch sensor.

As shown in FIG. 4, the touch sensor array 14 may include a plurality of touch sensors TS formed inside the pixel array of the display panel 10. The pixel array of the display panel 10 is formed on the lower glass substrate GLS2 and includes the data lines D1 to Dm, the gate lines G1 to Gn, pixel switching TFTs, the storage capacitor Cst, the pixel electrodes 1, and the like. Each of the touch sensors TS shown in FIG. 4 may include a TFT and a capacitor for detecting a sensor voltage. The TFT of the touch sensor TS and the pixel switching TFTs of the pixel array are simultaneously formed, and the capacitor of the touch sensor TS and the storage capacitor Cst are simultaneously formed.

FIGS. 5 to 7 illustrate the touch sensors mounted inside the pixel array of the display panel 10 and the TSIC. The touch sensors mounted inside the pixel array are not limited to examples illustrated in FIGS. 5 to 7 and may be embodied in many different forms.

As shown in FIGS. 5 to 7, each of the touch sensors TS may include a sensor TFT Tss, a storage capacitor CSTO, and a switching TFT Tsw.

The sensor TFT Tss opposes a transparent window W of the upper glass substrate GLS1. The black matrix BM is not formed on the transparent window W. A gate electrode of the sensor TFT Tss is connected to a storage reference voltage line STOL and one terminal of the storage capacitor CSTO. A drain electrode of the sensor TFT Tss is connected to a bias voltage supply line BL receiving a bias voltage Vbias, and a source electrode of the sensor TFT Tss is connected to the other terminal of the storage capacitor CSTO and a drain electrode of the switching TFT Tsw via a first node n1. If a touch object such as a user's finger or a stylus pen is placed on the upper glass substrate GLS1 opposite the sensor TFT Tss, light from the backlight unit BLU is transmitted by the lower glass substrate GLS2, the liquid crystal layer, and the upper glass substrate GLS1, is reflected by the touch object, and is incident on a semiconductor layer of the sensor TFT Tss. The sensor TFT Tss generates a current depending on an amount of light incident on the semiconductor layer of the sensor TFT Tss.

While the switching TFT Tsw is turned off, the storage capacitor CSTO is charged to the current generated by the sensor TFT Tss. Then, when the switching TFT Tsw is turned on, the storage capacitor CSTO is discharged.

The switching TFT Tsw opposes the black matrix BM of the upper glass substrate GLS1, so that light is not irradiated to the switching TFT Tsw. The switching TFT Tsw is turned on in response to the scan pulse from the gate lines G1 to Gn. The switching TFT Tsw supplies a voltage discharged by the storage capacitor CSTO to the readout lines R1 to Ri. A gate electrode of the switching TFT Tsw is connected to the gate lines G1 to Gn. A drain electrode of the switching TFT Tsw is connected to the source electrode of the sensor TFT Tss and the other terminal of the storage capacitor CSTO via the first node n1, and a source electrode of the switching TFT Tsw is connected to the readout lines R1 to Ri.

The TSIC shown in FIG. 7 is only an example of the touch signal processing circuit 15 connected to the touch sensor TS shown in FIG. 6 and thus is not limited thereto. Accordingly, the TSIC may be embodied in many different forms including a TFT and a storage capacitor. The TSIC shown in FIG. 7 is connected to the readout lines R1 to Ri. The TSIC includes an operational amplifier OPamp, first and second output switching elements SH0 and SH1, an output buffer, an analog-to-digital convertor (ADC), etc. A reset switching element SRT and a feedback capacitor Cfb are connected to a noninverting input terminal and an output terminal of the operational amplifier OPamp. A reference voltage V0 of 2V is supplied to an inverting terminal of the operational amplifier OPamp. The operational amplifier OPamp differentially amplifies an output from the readout lines R1 to Ri and the reference voltage to supply them to the first and second output switching elements SH0 and SH1. Before the switching TFT Tsw is turned on, the first output switching element SH0 is turned on and thus outputs the reference voltage V0. After the switching TFT Tsw is turned on, the second output switching element SH1 is turned on and thus outputs a touch sensor output voltage V1 input through the readout lines R1 to Ri. The TSIC converts a differential voltage between the reference voltage V0 and the touch sensor output voltage V1 into digital data using the ADC to transmit the digital data to a control board 50.

FIG. 8 illustrates an experimental device of touch data connected to the sensing device.

As shown in FIG. 8, the control board 50 includes the timing controller 11 and the touch data amplifier circuit. The timing controller 11 supplies digital video data to the data drive circuit 12 and controls operation timing of each of the data drive circuit 12 and the scan drive circuit 13. Further, the timing controller 11 controls operation timing of the touch signal processing circuit 15.

The touch data amplifier circuit of the control board 50 gives a weighed value to the digital data output from the TSICs to amplify the digital data. The touch data amplifier circuit removes noises mixed in the amplified digital data using a noise removing algorithm. The touch data amplifier circuit analyzes the digital data undergoing the amplifying process and the noise removing process to determine a touch area. Then, the touch data amplifier circuit calculates a coordinate value of the touch area.

The touch data amplifier circuit may be separated from the control board 50 and may be mounted inside each of the TSICs.

Figure 15:
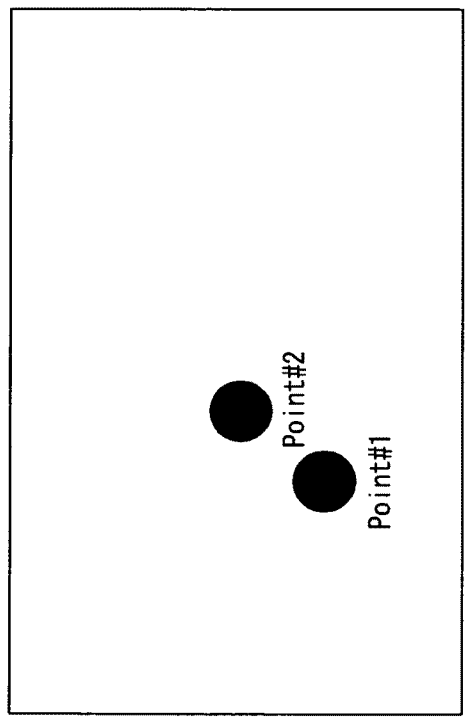
FIG. 15 is a captured image showing output data of TSICs generated when a user touches two points on a touch sensor array through his or her two fingers.
Figure 19:
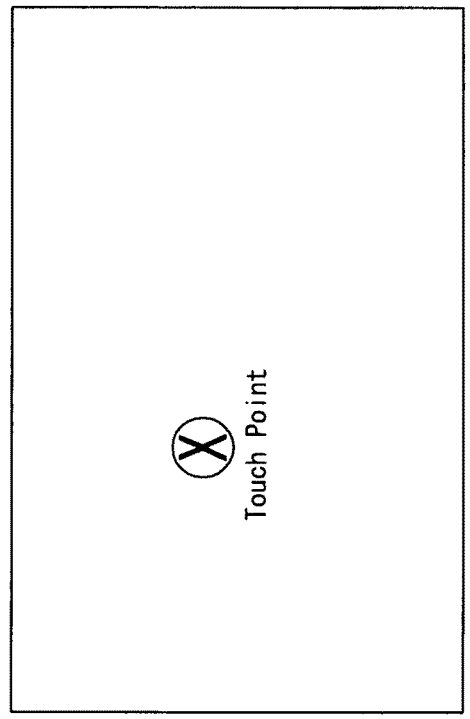
FIG. 19 illustrates output data of TSICs generated when a user touches one point on a touch sensor array using a pen.

An experimental device of touch data includes an interface board 51 connected to the control board 50, a computer 52, and a monitor 53. The experimental device of touch data is a device capable of seeing operations and sensibility of the touch sensors through the human eye. For this, the experimental device converts output singles of the touch sensors into image signals and displays the image signals on the monitor 53. Accordingly, the experimental device of touch data may be separated from the control board 50 after the sensing device and the display device are completed. The interface board 51 transfers the touch data and the coordinate values obtained from the touch data amplifier circuit to the computer 52 using an interface, such as serial peripheral interface (SPI), RS232, and I2C. The interface board 51 is inserted into a peripheral component interconnect (PCI) slot of the computer 52. The computer 52 supplies touch data input through the PCI slot to the monitor 53, and the monitor 53 displays the touch data supplied by the computer 52. FIGS. 15 and 19 illustrate an example of output data of the TSIC displayed on the monitor 53. More specifically, FIGS. 15 and 19 are captured images of the screen displayed on the monitor 53. In FIGS. 15 and 19, a bright portion of a circle indicates a touch area of the touch sensor array 14.

Figure 9:
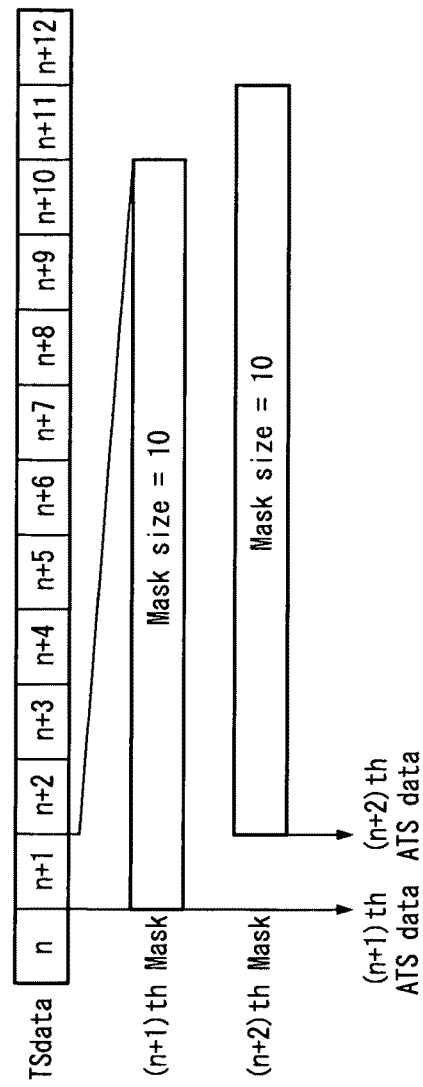
FIG. 9 illustrates a method for amplifying an output of a touch sensor.
Figure 12:
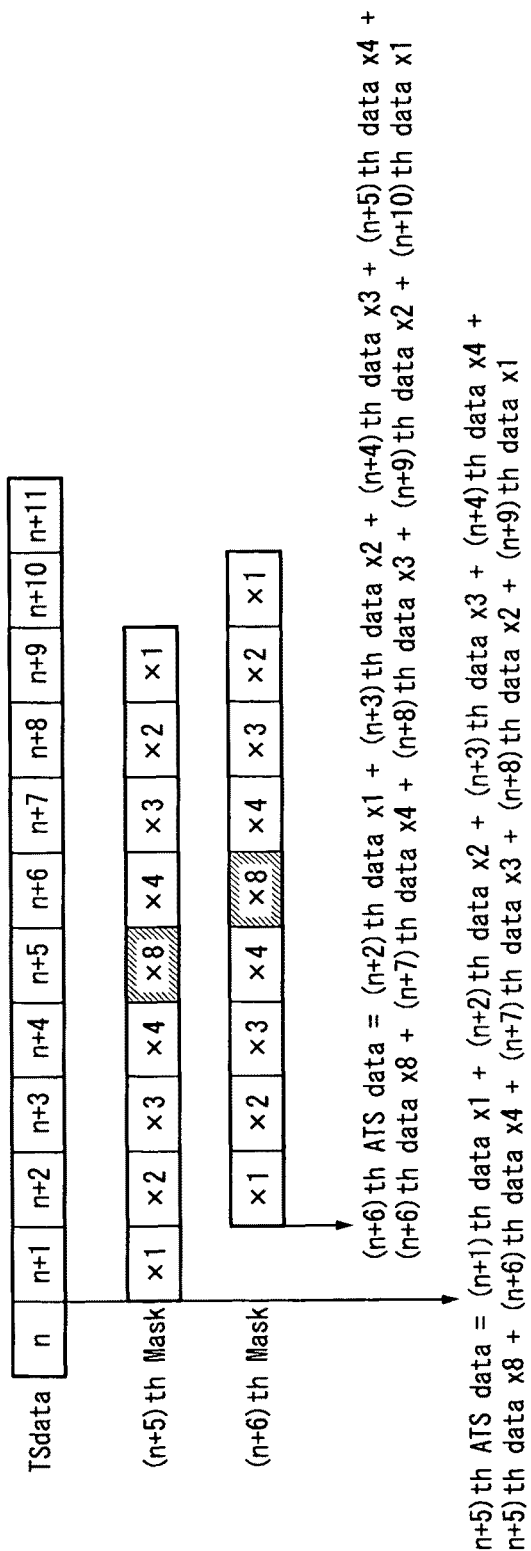
FIG. 12 illustrates an exemplary method for amplifying an output of a sensing device according to an embodiment of the invention.

The touch data amplifier circuit may amplify output data of the TSICs using amplifying methods illustrated in FIGS. 9 and 12. However, it is preferable that the touch data amplifier circuit uses the amplifying method illustrated in FIG. 12, because the amplifying method can increase sensitivity and accuracy in each of a finger-touch operation and a pen-touch operation and can determine whether the touch sensor array 14 is touched using the same threshold value in both the finger-touch operation and the pen-touch operation.

In the amplifying method illustrated in FIG. 9, with respect to each of digital data output from the TSIC, digital data values in mask are added to calculate amplification data ATS data. The mask includes 10 successive digital data. In the amplifying method, when the mask is shifted by 1 sensor output, each of digital data output from the TSIC is amplified. For example, the amplification data ATS data is obtained as follows: (n+1)th ATS data=(n+1)th data+(n+2)th data+(n+3)th data+(n+4)th data+(n+5)th data+(n+6)th data+(n+7)th data+(n+8)th data+(n+9)th data+(n+10)th data; and (n+2)th ATS data=(n+2)th data+(n+3)th data+(n+4)th data+(n+5)th data+(n+6)th data+(n+7)th data+(n+8)th data+(n+9)th data+(n+10)th data+(n+11)th data.

Figure 10:
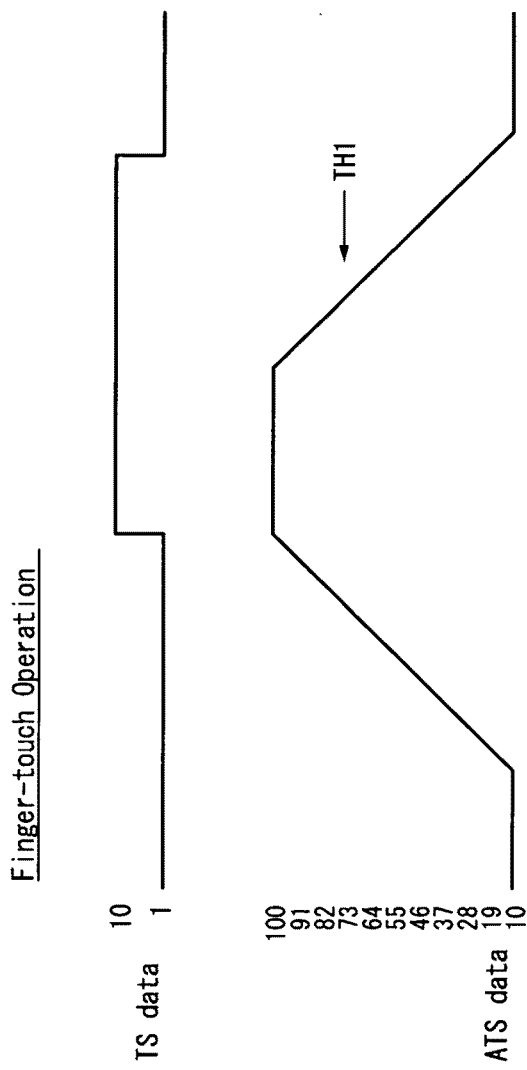
FIG. 10 illustrates an example of using an amplifying method illustrated in FIG. 9 in a finger-touch operation.
Figure 11:
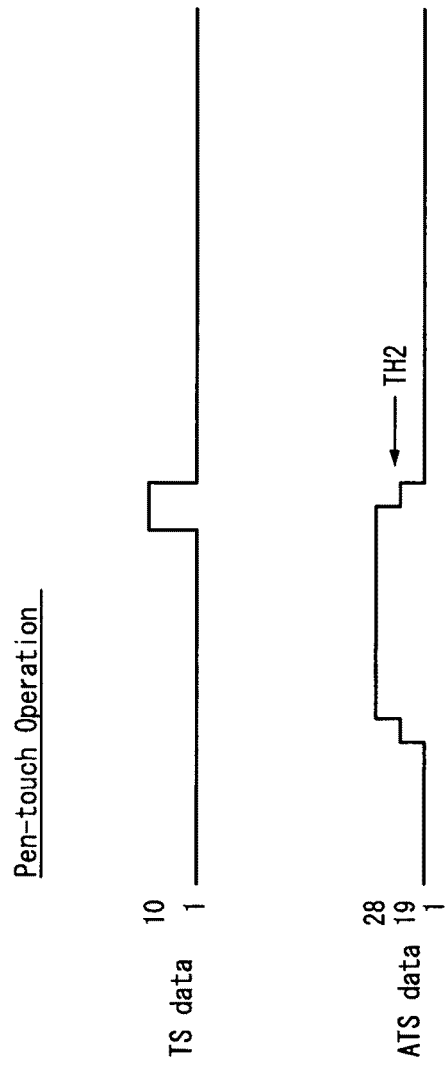
FIG. 11 illustrates an example of using an amplifying method illustrated in FIG. 9 in a pen-touch operation.

FIG. 10 illustrates an example of using the amplifying method illustrated in FIG. 9 in a finger-touch operation. FIG. 11 illustrates an example of using the amplifying method illustrated in FIG. 9 in a pen-touch operation. In FIGS. 10 and 11, it is assumed that a touch data value in a touch area is 10 and a touch data value in a non-touch area is 1.

As shown in FIG. 10, a touch area in a finger-touch operation is greater than a touch area in a pen-touch operation, and thus the number of touch sensors used in the finger-touch operation is greater than the number of touch sensors used in the pen-touch operation. Because of this, touch digital having a data value equal to or greater than a first threshold value TH1 in the finger-touch operation is generated in a relatively wide portion. In the amplifying method illustrated in FIG. 9, touch data that has a touch data value '10' in the touch area and has a touch data value '1' in the non-touch area is added without giving a weighted value to the touch data. As a result, amplification data ATS data may be obtained by amplifying touch data of the touch area, but an amplification area is widely distributed. Accordingly, it is difficult to increase the sensitivity and the accuracy of the touch sensors in the finger-touch operation at a satisfactory level using the amplifying method illustrated in FIG. 9.

As shown in FIG. 11, touch digital having a data value equal to or greater than a second threshold value TH2 in the pen-touch operation is generated in a relatively narrow portion. In the amplifying method illustrated in FIG. 9, touch data that has a touch data value '10' in the touch area and has a touch data value '1' in the non-touch area is added without giving a weighted value to the touch data. As a result, amplification data ATS data may be obtained by amplifying touch data of the touch area, but an amplification area is widely distributed. Accordingly, it is difficult to increase the sensitivity and the accuracy of the touch sensors in the pen-touch operation at a satisfactory level using the amplifying method illustrated in FIG. 9.

In the amplifying method illustrated in FIG. 9, if the first threshold value TH1 for determining whether or not the finger-touch operation is performed is equal to the second threshold value TH2 for determining whether or not the pen-touch operation is performed, the sensitivity and the accuracy of the touch sensors are greatly reduced. As shown in FIG. 10, there is a great difference between the data of the non-touch area and the data of the touch area in the amplification data ATS data obtained in the finger-touch operation. On the other hand, as shown in FIG. 11, there is a relatively small difference between the data of the non-touch area and the data of the touch area in the amplification data ATS data obtained in the pen-touch operation. If the first threshold value TH1 is reduced so as to be equal to the second threshold value TH2, a touch area may be more widely sensed than an actual finger-touch area in the finger-touch operation. Namely, an actual non-touch area may be recognized as a touch area. If the second threshold value TH2 increases so as to be equal to the first threshold value TH1, an actual pen-touch area may be recognized as a non-touch area. Accordingly, in the amplifying method illustrated in FIG. 9, the first threshold value TH1 and the second threshold value TH2 have to be set differently from each other. Because of this, the amplifying method illustrated in FIG. 12 is used in the embodiments of the invention.

In the amplifying method illustrated in FIG. 12, with respect to the each of digital data output from the TSIC, each of digital data values is multiplied by different weighed values depending on a location of the touch sensor. The digital data multiplied by the weighed values is added to calculate amplification data ATS data. The mask includes the same number of digital data from side to side based on the amplified digital data. Accordingly, the size of the mask is set, so that the different weighed values are given to digital data output from the touch sensors, whose the total number is an odd number, on the same line. In the amplifying method illustrated in FIG. 12, when the mask is shifted by 1 sensor output, each of digital data output from the touch sensors is amplified.

In the amplifying method illustrated in FIG. 12, a maximum weighted value is given to the digital data of the touch sensor positioned in the middle of the mask, and a minimum weighted value is given to the digital data of the touch sensors positioned at both edges of the mask. In other words, the weighed value decreases as it goes from the middle to both edges of the mask. As shown in FIG. 12, for example, weighted values 1, 2, 3, 4, 8, 4, 3, 2, and 1 are given to the digital data of the touch sensors positioned from one edge to the other edge of the mask in the order named. In case the weighed values are given as shown in FIG. 12, amplification data Nth ATS data of Nth digital data is calculated by the following Equation (1).

$$N\text{th } ATS \text{ data}=(N-4)\text{th data}\times 1+(N-3)\text{th data}\times 2+(N-2)\text{th data}\times 3+(N-1)\text{th data}\times 4+N\text{th data}\times 8+(N+1)\text{th data}\times 4+(N+2)\text{th data}\times 3+(N+3)\text{th data}\times 2+(N+4)\text{th data}\times 1 \quad (1)$$

In the example shown in FIG. 12, amplification data n-th ATS data of n-th digital data is calculated as follows: n-th ATS data=(n−4)th data (=0)×1+(n−3)th data (=0)×2+(n−2)th data (=0)×3+(n−1)th data (=0)×4+n-th data×8+n+1)th data×4+(n+2)th data×3+(n+3)th data×2+(n+4)th data×1. Amplification data (n+1)th ATS data of (n+1)th digital data is calculated as follows: (n+1)th ATS data=(n−3)th data (=0)×1+(n−2)th data (=0)×2+(n−1)th data (=0)×3+(n)th data×4+(n+1)th data×8+(n+2)th data×4+(n+3)th data×3+(n+4)th data×2+(n+5)th data×1. Amplification data (n+2)th ATS data of (n+2)th digital data is calculated as follows: (n+2)th ATS data=(n−2)th data (=0)×1+(n−1)th data (=0)×2+nth data×3+(n+1)th data×4+(n+2)th data×8+(n+3)th data×4+(n+4)th data×3+(n+5)th data×2+(n+6)th data×1. Amplification data (n+3)th ATS data of (n+3)th digital data is calculated as follows: (n+3)th ATS data=(n−1)th data(=0)×1+nth data×2+(n+1)th data×3+(n+2)th data×4+(n+3)th data×8+(n+4)th data×4+(n+5)th data×3+(n+6)th data×2+(n+7)th data×1. Amplification data (n+4)th ATS data of (n+4)th digital data is calculated as follows: (n+4)th ATS data=nth data×1+(n+1)th data×2+(n+2)th data×3+(n+3)th data×4+(n+4)th data×8+(n+5)th data×4+(n+6)th data×3+(n+7)th data×2+(n+8)th data×1. Amplification ata (n+5)th ATS data of (n+5)th digital data is calculated as follows: (n+5)th ATS data=(n+1)th data×1+(n+2)th data×2+(n+3)th data×3+(n+4)th data×4+(n+5)th data×8+(n+6)th data×4+(n+7)th data×3+(n+8)th data×2+(n+9)th data×1. Amplification data (n+6)th ATS data of (n+6)th digital data is calculated as follows: (n+6)th ATS data=(n+2)th data×1+(n+3)th data×2+(n+4)th data×3+(n+5)th data×4+(n+6)th data×8+(n+7)th data×4+(n+8)th data×3+(n+9)th data×2+(n+10)th data×1.

Figure 13:
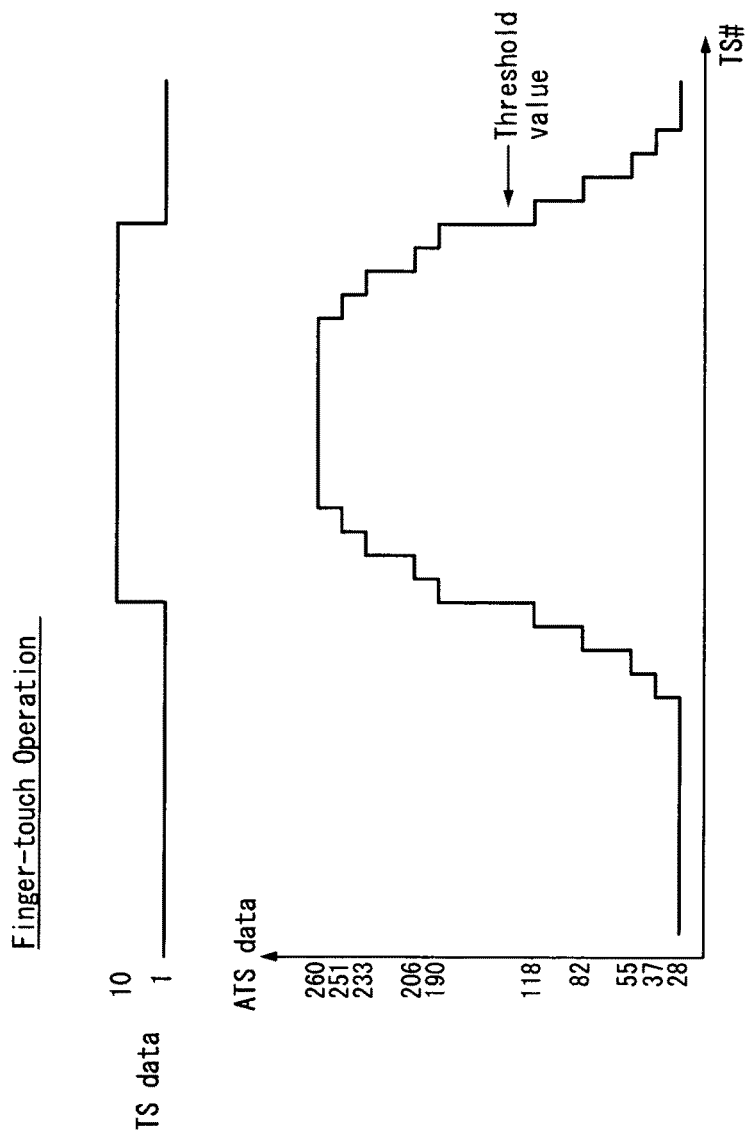
FIG. 13 illustrates an example of using an amplifying method illustrated in FIG. 12 in a finger-touch operation.
Figure 14:
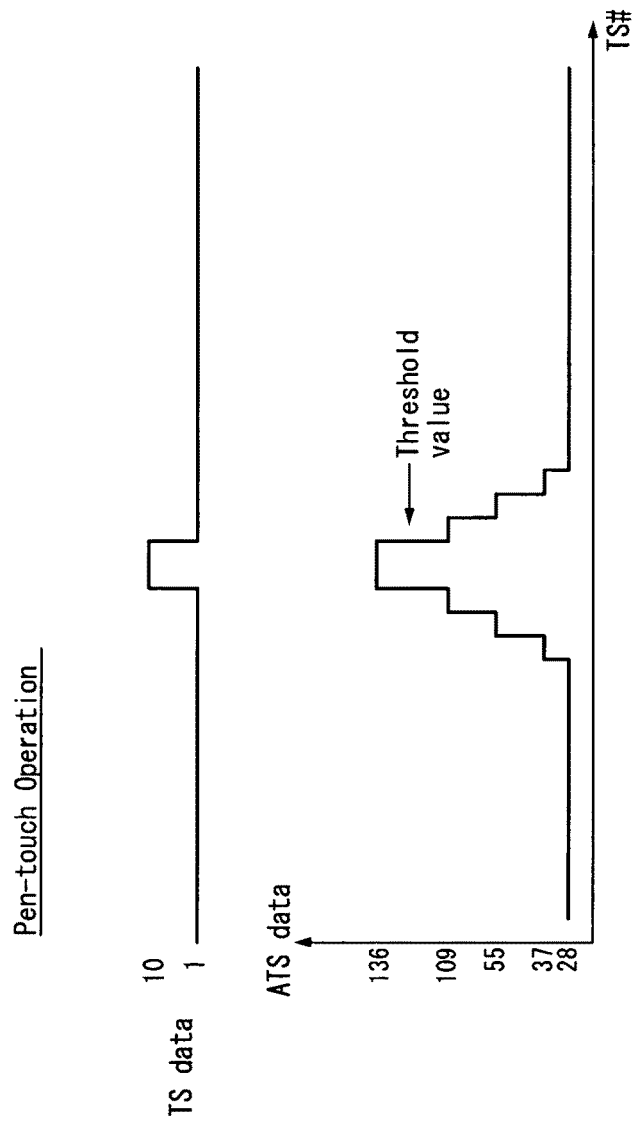
FIG. 14 illustrates an example of using an amplifying method illustrated in FIG. 12 in a pen-touch operation.

FIG. 13 illustrates an example of using the amplifying method illustrated in FIG. 12 in a finger-touch operation. FIG. 14 illustrates an example of using the amplifying method illustrated in FIG. 12 in a pen-touch operation. In FIGS. 13 and 14, it is assumed that the size of a touch area and the size of a non-touch area are the same as those illustrated in FIGS. 10 and 11. Further, in FIGS. 13 and 14, it is assumed that a touch data value in the touch area is 10 and a touch data value in the non-touch area is 1.

As shown in FIG. 13, a touch area in a finger-touch operation is greater than a touch area in a pen-touch operation, and thus the number of touch sensors used in the finger-touch operation is greater than the number of touch sensors used in the pen-touch operation. Because of this, touch data having a data value equal to or greater than a threshold value in the finger-touch operation is generated in a relatively wide portion. If digital data output from the touch sensors in the finger-touch operation is amplified using the amplifying method illustrated in FIG. 12, as shown in FIG. 13, amplification data ATS data in the touch area is calculated as 260, and amplification data ATS data in the non-touch area is calculated as 28. Accordingly, the amplifying method illustrated in FIG. 12 can reduce diffusion of the touch area in the finger-touch operation and can allow amplification data of the touch area to be greater than amplification data of the non-touch area. As a result, the sensitivity and the accuracy in the finger-touch operation using the amplifying method illustrated in FIG. 12 can increase as compared with the amplifying method illustrated in FIG. 9.

As shown in FIG. 14, touch data having a data value equal to or greater than a threshold value in the pen-touch operation is generated in a relatively narrow portion. If digital data output from the touch sensors in the pen-touch operation is amplified using the amplifying method illustrated in FIG. 12, as shown in FIG. 14, amplification data ATS data in the touch area is calculated as 136, and amplification data ATS data in the non-touch area is calculated as 28. Accordingly, the amplifying method illustrated in FIG. 12 can reduce diffusion of the touch area in the pen-touch operation and can allow amplification data of the touch area to be greater than amplification data of the non-touch area. As a result, the touch sensitivity and the accuracy in the pen-touch operation using the amplifying method illustrated in FIG. 12 can increase as compared with the amplifying method illustrated in FIG. 9.

In the amplifying method illustrated in FIG. 12, the threshold value for determining whether or not the finger-touch operation is performed may be equal to the threshold value for determining whether or not the pen-touch operation is performed. In FIGS. 13 and 14, if the threshold value is determined within the range between 118 and 136, the touch area of each of the finger-touch operation and the pen-touch operation may be sensed at high sensitivity. The touch recognition circuit may compare the touch data amplified using the amplifying method illustrated in FIG. 12 with the threshold value to determine whether or not a touch operation is performed. The touch recognition circuit may distinguish the finger-touch operation from the pen-touch operation depending on a width of successive amplification data having a data value equal to or greater than the threshold value.

FIGS. 15 to 22 illustrate an experimental result conducted for proofing an effect of the amplifying method according to the embodiment of the invention.

Figure 16:
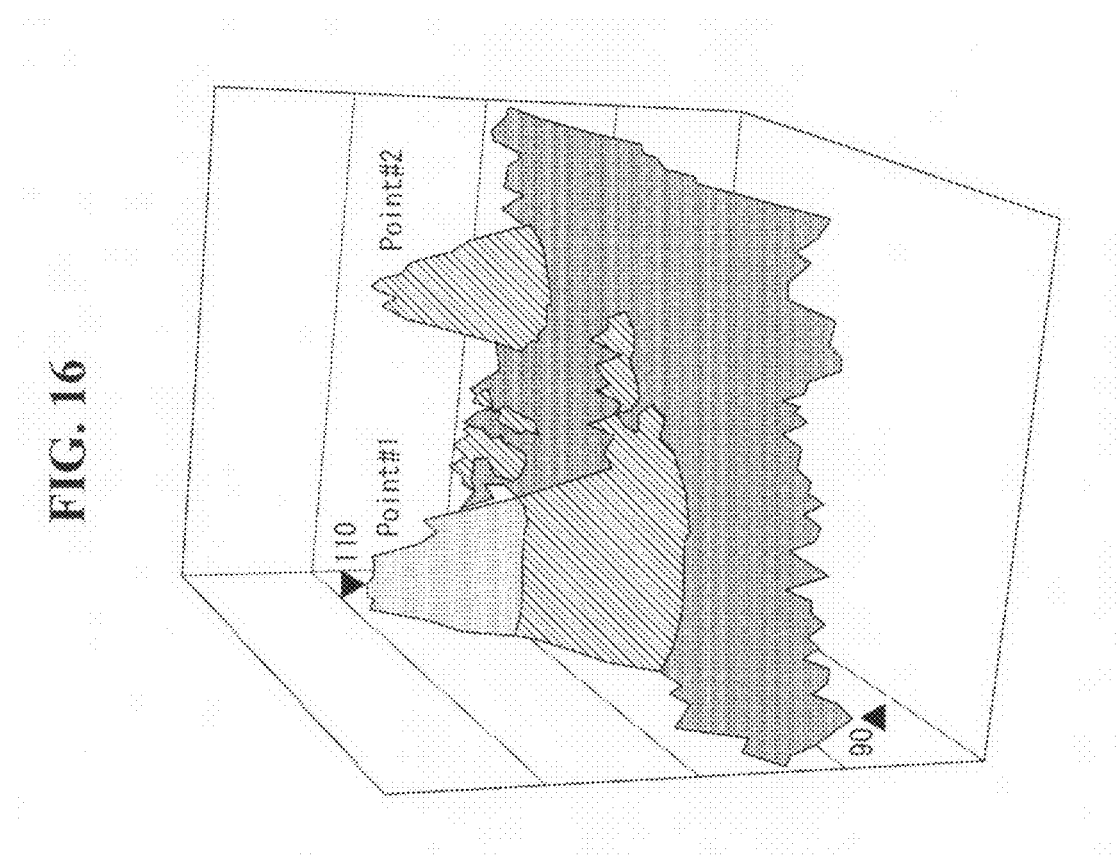
FIG. 16 is a three-dimensional graph showing touch data of FIG. 15.

FIG. 15 illustrates output data of the TSIC generated when a user touches two points Point#1 and Point#2 on the touch sensor array 14 through his or her two fingers. More specifically, FIG. 15 illustrates the output data of the TSIC before amplification displayed on the monitor 53. FIG. 16 is a three-dimensional graph showing the output data of the TSIC before amplification. In the graph of FIG. 16, a minimum value of the output data is about 90, a maximum value of the output data is about 110, and a difference between the maximum value and the minimum value is about 20. Considering a noise of the touch sensor array 14, about 100 may be considered as a maximum value of the non-touch area, and a middle value (for example, about 10) of the difference may be considered as a threshold value so as to sense finger-touch points in a finger-touch operation. In this case, the second finger-touch point Point#2 is not sensed.

Figure 17:
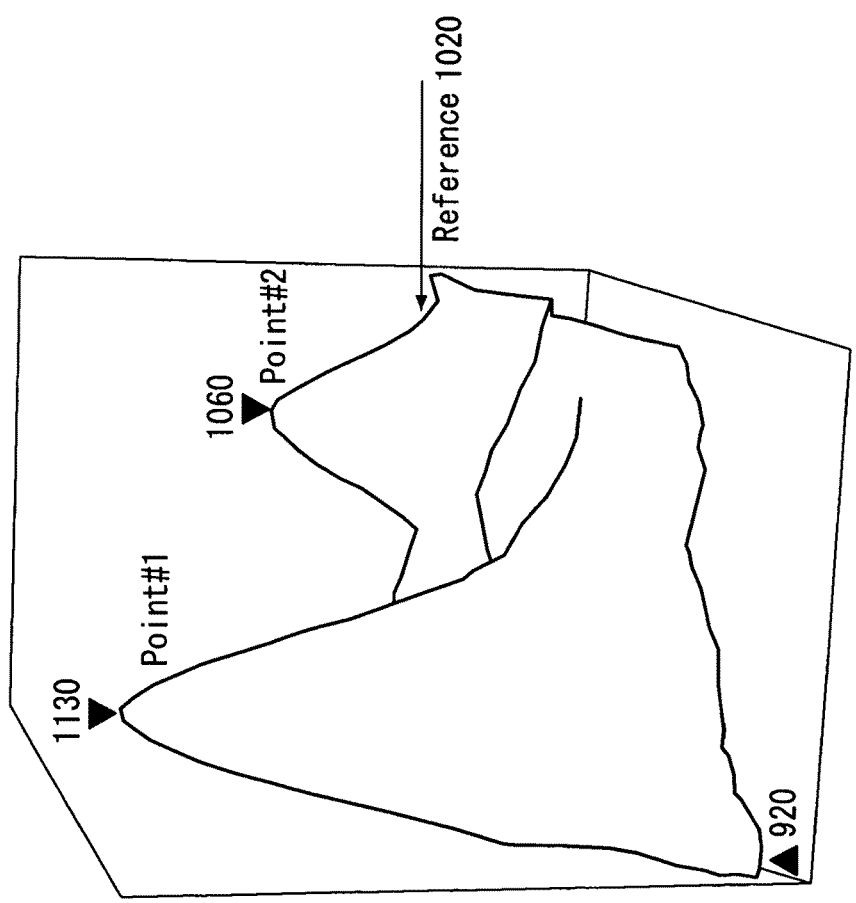
FIG. 17 is a three-dimensional graph showing an example of amplifying output data of FIG. 16 using an amplifying method illustrated in FIG. 9.

FIG. 17 illustrates an example of amplifying the output data of FIG. 16 using the amplifying method illustrated in FIG. 9. The minimum value '90' is amplified to about 920 and the maximum value '110' is amplified to about 1130 as a result of amplifying the output data of FIG. 16 using the amplifying method illustrated in FIG. 9. If a reference value for distinguishing the non-touch area from the touch area is set at about 1020 in FIG. 17, the first finger-touch point Point#1 may be sensed as an amplified value greater than the reference value by a value equal to or greater than 11 and the second finger-touch point Point#2 may be sensed as an amplified value greater than the reference value by a value equal to or greater than 4. As shown in FIG. 17, the sensitivity of the touch sensors may be greater than the sensitivity in FIG. 15 by amplifying the output data of the touch sensors using the amplifying method illustrated in FIG. 9. However, because the touch points are dispersed, a calculation amount required to detect each of the touch points increases.

Figure 18:
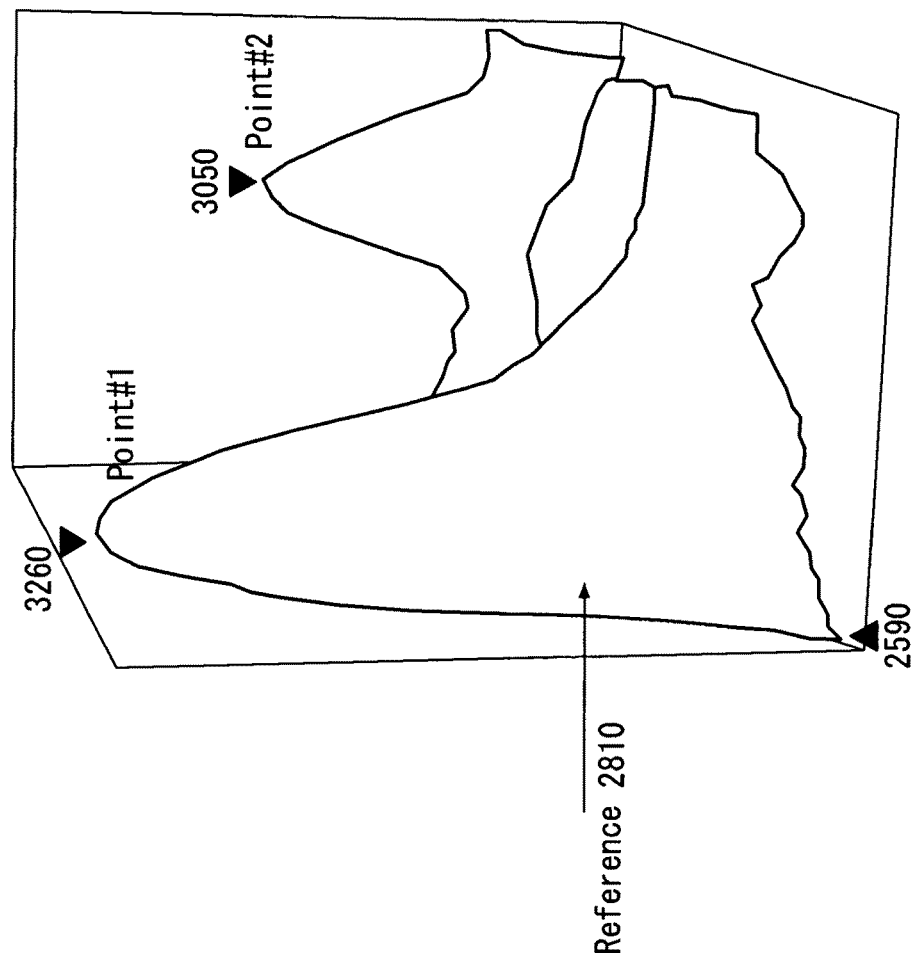
FIG. 18 is a three-dimensional graph showing an example of amplifying output data of FIG. 16 using an amplifying method illustrated in FIG. 12.

FIG. 18 illustrates an example of amplifying the output data of FIG. 16 using the amplifying method illustrated in FIG. 12. The minimum value '90' is amplified to about 2590 and the maximum value '110' is amplified to about 3260 as a result of amplifying the output data of FIG. 16 using the amplifying method illustrated in FIG. 12. If a reference value for distinguishing the non-touch area from the touch area is set at about 2810 in FIG. 18, the first finger-touch point Point#1 may be sensed as an amplified value greater than the reference value by a value equal to or greater than 45 and the second finger-touch point Point#2 may be sensed as an amplified value greater than the reference value by a value equal to or greater than 24. As shown in FIG. 18, a noise of the non-touch area can be prevented by allowing an amplification level of the touch area to be greater than an amplification level of the non-touch area using the amplifying method illustrated in FIG. 12. As shown in FIG. 18, because a dispersion level of each of the touch points is lowered as compared with the graph of FIG. 17, the sensitivity of each of the touch points in FIG. 18 may increase as compared with the graph of FIG. 17 even if a calculation amount in FIG. 18 is less than a calculation amount in FIG. 17.

Figure 20:
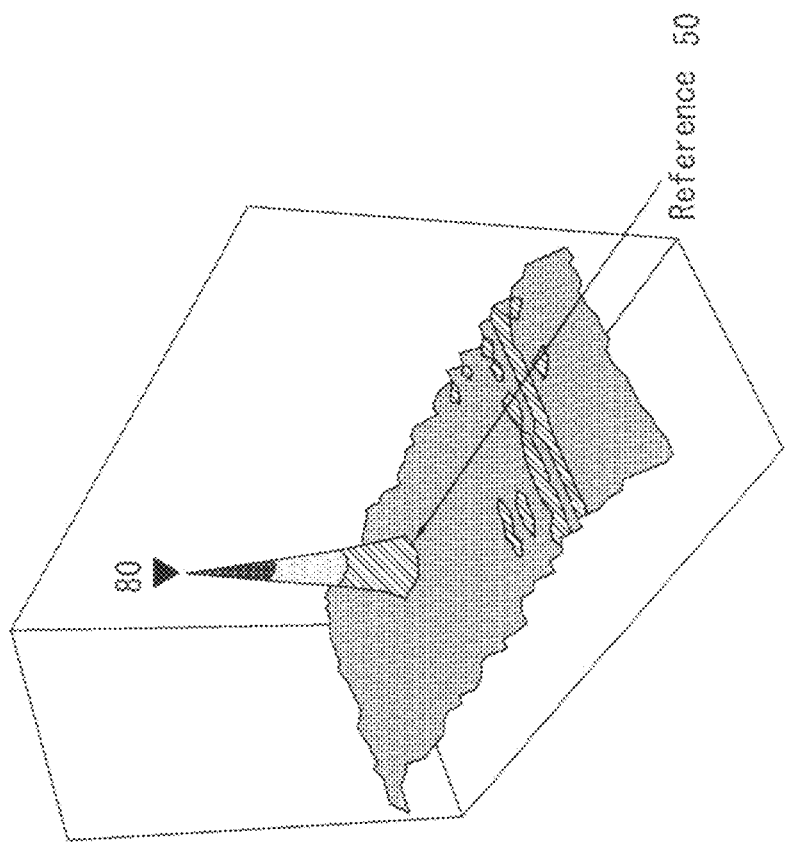
FIG. 20 is a three-dimensional graph showing touch data of FIG. 19.

FIG. 19 illustrates output data of the TSIC generated when the user touches one point 'Touch Point' on the touch sensor array 14 using a pen. More specifically, FIG. 19 illustrates the output data of the TSIC before amplification displayed on the monitor 53. FIG. 20 is a three-dimensional graph showing the output data of the TSIC before amplification. In the graph of FIG. 20, a maximum value of the output data is about 80. Considering a noise of the touch sensor array 14, about 50 may be considered as a maximum value of the non-touch area, and about 20 may be considered as a threshold value so as to sense a pen-touch point in a pen-touch operation. If the user's pen-touch pressure is small, the pen-touch point is sensed as a value equal to or less than the threshold value 20. Therefore, output data of the TSIC has to be amplified so that the pen-touch point is sensed even if the user's pen-touch pressure is small.

Figure 21:
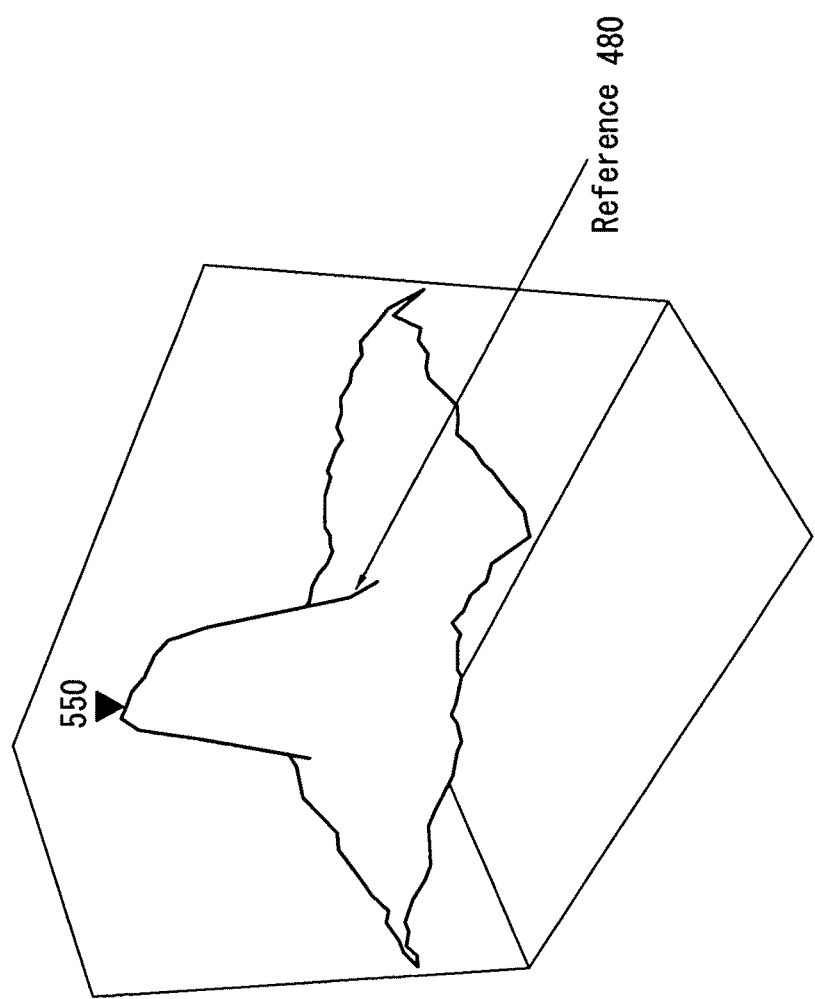
FIG. 21 is a three-dimensional graph showing an example of amplifying output data of FIG. 20 using an amplifying method illustrated in FIG. 9.

FIG. 21 illustrates an example of amplifying the output data of FIG. 20 using the amplifying method illustrated in FIG. 9. The maximum value '80' is amplified to about 550 as a result of amplifying the output data of FIG. 20 using the amplifying method illustrated in FIG. 9. If a reference value for distinguishing the non-touch area from the touch area is set at about 480 in FIG. 21, the pen-touch point may be sensed as an amplified value greater than the reference value by a value equal to or greater than 7. As shown in FIG. 21, the sensitivity of the touch sensors may be greater than the sensitivity in FIG. 20 by amplifying the output data of the touch sensors using the amplifying method illustrated in FIG. 9. However, because an amplification rate is reduced and the touch point is dispersed, the sensitivity and the accuracy in the pen-touch operation using the amplifying method illustrated in FIG. 9 are reduced. Further, as can be seen from FIGS. 10 and 11, because the threshold value of the finger-touch operation is different from the threshold value of the pen-touch operation in the amplifying method illustrated in FIG. 9, the finger-touch operation and the pen-touch operation have to be calculated as distinguished from each other.

Figure 22:
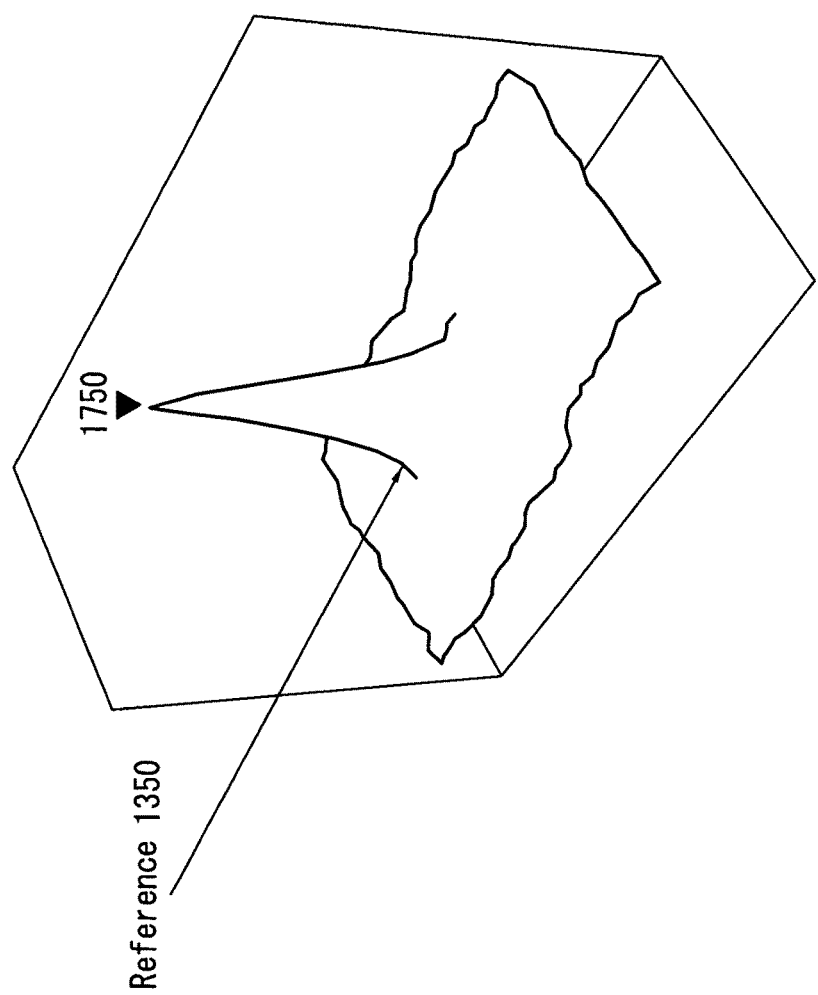
FIG. 22 is a three-dimensional graph showing an example of amplifying output data of FIG. 20 using an amplifying method illustrated in FIG. 12.

FIG. 22 illustrates an example of amplifying the output data of FIG. 20 using the amplifying method illustrated in FIG. 12. The maximum value '80' is amplified to about 1750 as a result of amplifying the output data of FIG. 20 using the amplifying method illustrated in FIG. 12. If a reference value for distinguishing the non-touch area from the touch area is set at about 1350 in FIG. 22, the pen-touch point may be sensed as an amplified value greater than the reference value by a value equal to or greater than 40. As shown in FIG. 22, a noise of the non-touch area can be prevented by allowing an amplification level of the touch area to be greater than an amplification level of the non-touch area using the amplifying method illustrated in FIG. 12. As shown in FIG. 22, because a dispersion level of the touch point is lowered as compared with the graph of FIG. 21, the sensitivity of the touch point in FIG. 22 may increase as compared with the graph of FIG. 21 even if a calculation amount in FIG. 22 is less than a calculation amount in FIG. 21. Further, as can be seen from FIGS. 13 and 14, because the threshold value of the finger-touch operation is equal to the threshold value of the pen-touch operation in the amplifying method illustrated in FIG. 12, the finger-touch operation and the pen-touch operation do not have to be calculated as distinguished from each other.

As described above, in the sensing device and the method for amplifying the output of the sensing device according to the embodiments of the invention, the sensitivity and the accuracy of the touch sensors may increase by giving different weighted values to output data of the adjacent touch sensors. Further, a calculation amount and hardware complexity may be reduced by using the same threshold value in different touch operations.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A sensing device comprising:
   a sensor array including a plurality of sensors;
   a touch signal processing circuit that outputs differential voltages between the sensor outputs from the sensors and a predetermined reference voltage, and converts differential voltages into digital data; and
   an amplifier circuit that multiplies different weighted values to each of the digital data depending on a location of the sensor, and calculates an amplified digital data by adding the digital data multiplied by the weighed values.

2. The sensing device of claim 1, wherein the sensors are formed inside a pixel array of a display panel.

3. The sensing device of claim 2, wherein the display panel is a flat panel display panel of one of a liquid crystal display (LCD), a field emission display (FED), a plasma display panel (PDP), and an electroluminescence device (EL).

4. The sensing device of claim 1, wherein the amplifier circuit multiplies a maximum weighted value to a sensor output to be amplified and multiplies a weighted value less than the maximum weighted value to a sensor output adjacent to the sensor output to be amplified.

5. The sensing device of claim 1, wherein the amplifier circuit sets a section that multiplies different weighted values to sensor outputs obtained from the sensors of which a total number is an odd number, positioned on a same line,
   wherein when the amplifier circuit shifts the section, the amplifier circuit amplifies each of the sensor outputs.

6. The sensing device of claim 5, wherein the amplifier circuit multiplies a maximum weighted value to the sensor output positioned in the middle of the section and multiplies a minimum weighted value to the sensor outputs positioned at both edges of the section.

7. The sensing device of claim 6, wherein the amplifier circuit multiplies the decreasing weighed values to the sensor outputs as the sensor outputs go from the middle to both edges of the section.

8. The sensing device of claim 1, further comprising a touch recognition circuit that compares touch data amplified by the amplifier circuit with a predetermined threshold value to determine whether or not a touch operation is performed.

9. The sensing device of claim 8, wherein the touch recognition circuit recognizes a finger-touch operation and a pen-touch operation using the same threshold value.

10. A method for amplifying an output of a sensing device comprising:
    obtaining sensor outputs from a sensor array including a plurality of sensors;
    outputting differential voltages between the sensor outputs from the sensors and a predetermined reference voltage;
    converting the differential voltages into digital data; and
    multiplying different weighted values to each of the digital data depending on a location of the sensor, and calculating an amplified digital data by adding the digital data multiplied by the weighed values.

11. The method of claim 10, wherein the multiplying of the different weighted values includes:
    multiplying a maximum weighted value to a sensor output to be amplified; and
    multiplying a weighted value less than the maximum weighted value to a sensor output adjacent to the sensor output to be amplified.

12. The method of claim 10, wherein the amplifying of the different weighted values includes:
    setting a section that multiplies the different weighted values to sensor outputs obtained from the sensors, whose a total number is an odd number, positioned on the same line; and
    shifting the section to amplify each of the sensor outputs.

13. The method of claim 12, wherein the setting of the section includes:

multiplying a maximum weighted value to the sensor output positioned in the middle of the section; and multiplying a minimum weighted value to the sensor outputs positioned at both edges of the section.

14. The method of claim 13, wherein the setting of the section includes multiplying the decreasing weighed values to the sensor outputs as the sensor outputs go from the middle to both edges of the section.

15. The method of claim 10, further comprising comparing the amplified sensor outputs with a predetermined threshold value to determine whether or not a touch operation is performed.

16. The method of claim 15, wherein the determining whether or not the touch operation is performed includes recognizing a finger-touch operation and a pen-touch operation using the same threshold value.

* * * * *